US009049650B2

(12) United States Patent
Gajula et al.

(10) Patent No.: US 9,049,650 B2
(45) Date of Patent: Jun. 2, 2015

(54) METHODS AND APPARATUS FOR SELECTING AN INTER-RADIO ACCESS TECHNOLOGY FOR AN ELECTRONIC DEVICE

(71) Applicant: Motorola Mobility LLC, Libertyville, IL (US)

(72) Inventors: Nagaraju Gajula, Grayslake, IL (US); Frank D Ciotti, Austin, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 78 days.

(21) Appl. No.: 13/708,239

(22) Filed: Dec. 7, 2012

(65) Prior Publication Data

US 2014/0162632 A1 Jun. 12, 2014

(51) Int. Cl.
H04W 36/00 (2009.01)
H04W 4/00 (2009.01)
H04W 48/18 (2009.01)
H04W 24/02 (2009.01)
H04W 88/06 (2009.01)

(52) U.S. Cl.
CPC .............. *H04W 48/18* (2013.01); *H04W 24/02* (2013.01); *H04W 88/06* (2013.01)

(58) Field of Classification Search
CPC .............................. H04W 36/30; H04W 36/32
USPC ............................ 455/436, 441; 370/331, 332
See application file for complete search history.

(56) References Cited

U.S. PATENT DOCUMENTS

| 6,067,460 | A  | 5/2000 | Alanara et al. |
| 7,009,952 | B1 | 3/2006 | Razavilar et al. |
| 8,089,933 | B2 | 1/2012 | Cai et al. |
| 8,089,942 | B2 | 1/2012 | Cai et al. |

(Continued)

FOREIGN PATENT DOCUMENTS

| EP | 2475213 A2 | 7/2012 |
| WO | 2012119081 A1 | 9/2012 |

OTHER PUBLICATIONS

Patent Cooperation Treaty, International Search Report and Written Opinion of the International Searching Authority for International Application No. PCT/US2013/071570, Mar. 5, 2014, 11 pages.

*Primary Examiner* — Christopher M Brandt
(74) *Attorney, Agent, or Firm* — Faegre Baker Daniels LLP

(57) ABSTRACT

Methods and apparatus for selecting an inter-radio access technology for an electronic device are disclosed. In an embodiment, a wireless electronic device determines if a first radio signal strength (e.g., LTE) is weak enough that the device should start scanning for another radio access technology (e.g., CDMA). If the first radio signal strength (e.g., LTE) is very weak (e.g., even weaker than the level that caused the device to start scanning), and a second radio signal strength (e.g., CDMA) is above a second threshold, then the device selects the second radio access technology (e.g., switches from LTE to CDMA). If (a) the first radio signal strength (e.g., LTE) is not weak enough to warrant a move to another radio access technology, (b) the second radio signal strength (e.g., CDMA) is not above the second threshold (e.g., not strong enough to warrant a move), and/or (c) a motion sensor determines that the device is relatively stationary (e.g., signal strengths are unlikely to change), then the device sets a back-off timer (e.g., set to expire in one second before trying again, and then two seconds before trying again, then three seconds etc).

29 Claims, 7 Drawing Sheets

(56) References Cited

U.S. PATENT DOCUMENTS

| | | | |
|---|---|---|---|
| 2010/0279682 A1* | 11/2010 | Rangaiah et al. | 455/426.1 |
| 2012/0052864 A1 | 3/2012 | Swaminathan et al. | |
| 2012/0287851 A1* | 11/2012 | Lee | 370/328 |
| 2013/0012204 A1* | 1/2013 | Kim et al. | 455/435.1 |
| 2013/0084856 A1* | 4/2013 | Prasad et al. | 455/434 |
| 2013/0194954 A1* | 8/2013 | Dalsgaard et al. | 370/252 |

* cited by examiner

METHODS AND APPARATUS FOR SELECTING AN INTER-RADIO ACCESS TECHNOLOGY FOR AN ELECTRONIC DEVICE

The present disclosure relates in general to wireless communication devices, and, in particular, to methods and apparatus for selecting an inter-radio access technology for an electronic device.

BACKGROUND OF THE INVENTION

Cellular phone coverage varies by location and radio access technology. For example, some geographical areas are covered by long term evolution (LTE) radio access technology, some geographical areas are covered by code division multiple access (CDMA) radio access technology, and some geographical areas are covered by LTE, CDMA, and/or other radio access technologies.

Typically, cellular phones are designed to use more than one type of radio access technology and switch between different radio access technologies as needed. For example, a cellular phone capable of using both LTE and CDMA radio access technologies may prioritize the use of LTE, but switch over to CDMA if the LTE signal is weak and the CDMA signal is strong.

Accordingly, when such a cellular phone detects that the signal from its current radio access technology (e.g., LTE) is moderately weak, the cellular phone starts scanning for an alternate radio access technology (e.g., CDMA). If the signal from the current radio access technology (e.g., LTE) continues to be only moderately weak, the cellular phone continues to scan for an alternate radio access technology (e.g., CDMA). Subsequently, if the cellular phone detects that the signal from its current radio access technology (e.g., LTE) is severely weak, and the previously scanned signal from the alternate radio access technology is strong, the cellular phone selects the alternate radio access technology (e.g., switch from LTE to CDMA).

However, scanning for an alternate radio access technology consumes a significant amount of power. As a result, when a cellular phone remains in an area that continues to have a moderate signal level (e.g., LTE is fairly weak, but not weak enough to warrant a switch to CDMA), repetitious scanning for an alternate radio access technology causes a significant degradation in battery life.

DESCRIPTION

Figure 1:
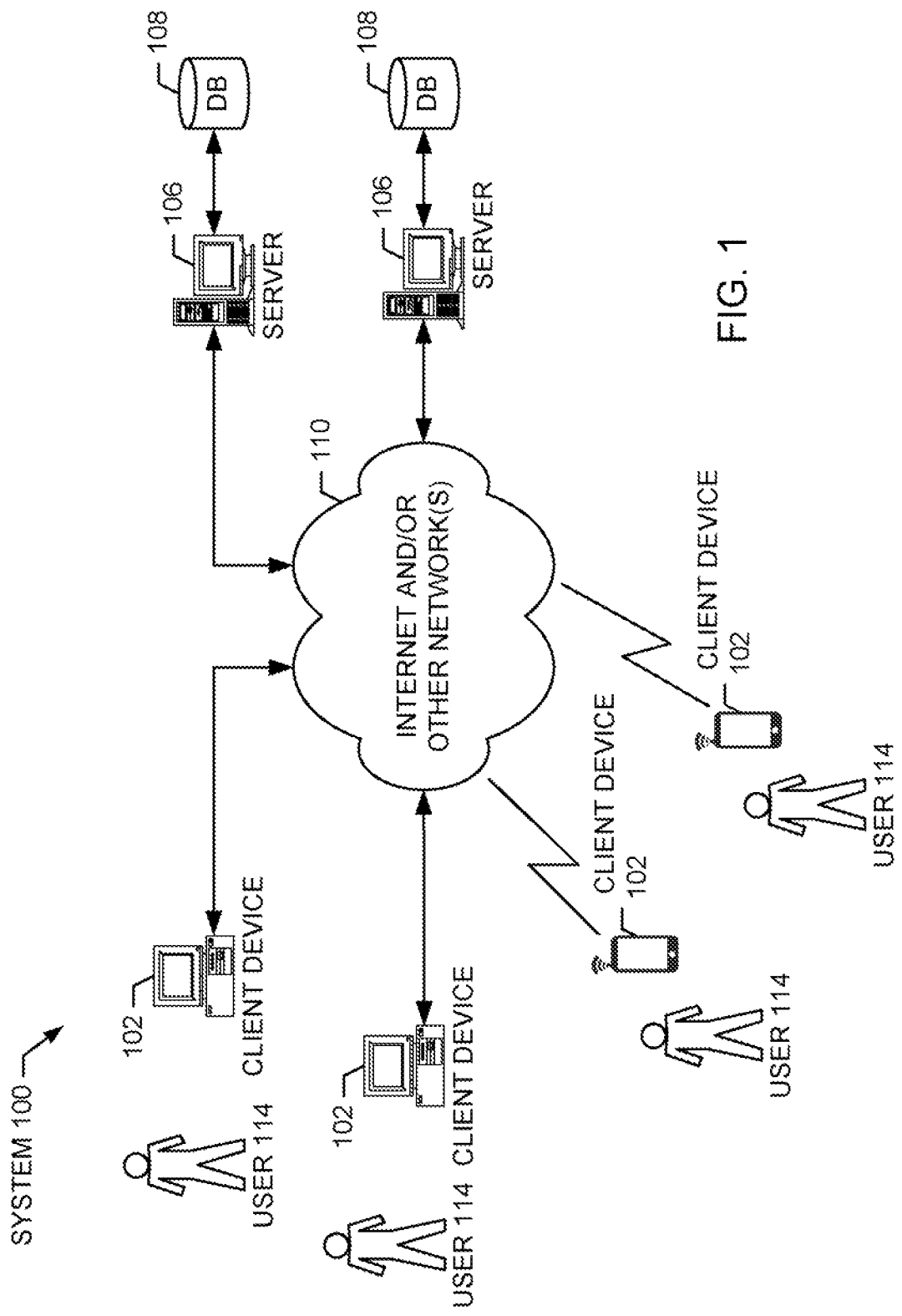
FIG. 1 is a block diagram of an example network communication system.

According to an embodiment of the invention, a cellular phone determines if the LTE signal the cellular phone is currently using is weak enough that the phone should start scanning for a CDMA signal to replace the LTE signal. If the LTE signal is very weak (e.g., even weaker than the level that caused the phone to start scanning), and the CDMA signal is strong, the phone switches to the CDMA signal. If (a) the LTE signal is not weak enough to warrant a move to CDMA, (b) the CDMA signal is not strong enough to warrant a move to CDMA, and/or (c) a motion sensor determines that the phone is relatively stationary (e.g., signal strengths are unlikely to change), then the phone sets a back-off timer (e.g., set to expire in one second before trying again, and then two seconds before trying again, then three seconds etc). When the back-off timer expires, the phone checks again to determine if the CDMA signal is strong enough to warrant a move to CDMA.

In an embodiment, a wireless electronic device determines if a first radio signal strength (e.g., LTE) is weak enough that the device should start scanning for another radio access technology (e.g., CDMA). If the first radio signal strength (e.g., LTE) is very weak (e.g., even weaker than the level that caused the device to start scanning), and a second radio signal strength (e.g., CDMA) is above a second threshold, then the device selects the second radio access technology (e.g., switches from LTE to CDMA). If (a) the first radio signal strength (e.g., LTE) is not weak enough to warrant a move to another radio access technology, (b) the second radio signal strength (e.g., CDMA) is not above the second threshold (e.g., not strong enough to warrant a move), and/or (c) a motion sensor determines that the device is relatively stationary (e.g., signal strengths are unlikely to change), then the device sets a back-off timer (e.g., set to expire in one second before trying again, and then two seconds before trying again, then three seconds etc). When the back-off timer expires, the electronic device checks again to determine if the second signal (e.g., CDMA) is strong enough to warrant a change to that radio access technology (e.g., move to CDMA).

According to an embodiment, a first signal strength monitor is structured to determine if a first radio signal strength associated with a first radio access technology is below a first threshold (e.g., RSSI of an LTE receiver). A second signal strength monitor is structured to measure a second radio signal strength associated with a second radio access technology in response to the first radio signal strength being below the first threshold (e.g., RSSI of a CDMA receiver). A radio access technology selector is operatively coupled to the first signal strength monitor and the second signal strength monitor, the radio access technology selector being structured to select the second radio access technology if the second radio signal strength is above a second threshold (e.g., if the CDMA signal is strong and the LTE signal is very weak, switch from using LTE to using CDMA). A back-off timer is operatively coupled to the radio access technology selector, the back-off timer being structured to expire a plurality of times at a decaying rate if the second radio signal strength is not above the second threshold a plurality of times (e.g., if the CDMA signal strength is repeatedly not strong enough to cause the radio access technology selector to switch from using LTE to using CDMA, the back-off timer may be set to expire in one second before trying again, and then two seconds before trying again, then three seconds etc.). The second signal strength monitor is structured to measure a third radio signal strength associated with the second radio access technology in response to the back-off timer expiring (e.g., measure the CDMA signal strength again).

In an embodiment, the apparatus includes a motion sensor, wherein the motion sensor is structured to determine that the electronic device is stationary thereby causing the second signal strength monitor to wait until the electronic device is in motion to measure a fourth radio signal strength associated with the second radio access technology.

In an embodiment, the motion sensor includes an accelerometer. In one example, the motion sensor includes a global positioning system.

In an embodiment, the apparatus includes a motion sensor, wherein the motion sensor is structured to determine if the electronic device is stationary or in motion and cause the back-off timer to be suspended if the electronic device is stationary and set to a time value if the electronic device is in motion.

In an embodiment, the apparatus includes a motion sensor, wherein the motion sensor is structured to determine if the electronic device is stationary or in motion and cause the back-off timer to be set to a first time value if the electronic device is stationary and a second time value if the electronic device is in motion, wherein the first time value is longer than the second time value.

In an embodiment, the radio access technology selector is structured to select the second radio access technology if the first radio signal strength is below a third threshold, wherein the third threshold is lower than the first threshold. In one example, the apparatus includes a controller operatively coupled to the back-off timer, wherein the controller is structured to set the back-off timer to a first time and subsequently set the back-off timer to a second time, wherein the second time is longer than the first time.

In an embodiment, the first time is based on a value received from a cellular network.

In an embodiment, the back-off timer is structured to reach a maximum expire time.

In an embodiment, the back-off timer is suspended in response to a radio access technology reselection.

In an embodiment, selecting the second radio access technology is based on an access technology priority.

In an embodiment, the access technology priority is received from a cellular network.

In an embodiment, the first radio access technology includes at least one of a long term evolution (LTE) access technology, a code division multiple access (CDMA2000) access technology, a global system for mobile (GSM) access technology, and a universal mobile telecommunications system (UMTS) access technology.

Turning now to the figures, a block diagram of certain elements of an example network communications system 100 is illustrated in FIG. 1. The illustrated system 100 includes one or more client devices 102 (e.g., computer, television, camera, phone), one or more web servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network.

The web server 106 stores a plurality of files, programs, and/or web pages in one or more databases 108 for use by the client devices 102 as described in detail below. The database 108 may be connected directly to the web server 106 and/or via one or more network connections. The database 108 stores data as described in detail below.

One web server 106 may interact with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, a single microprocessor, and a single network connection.

Figure 2:
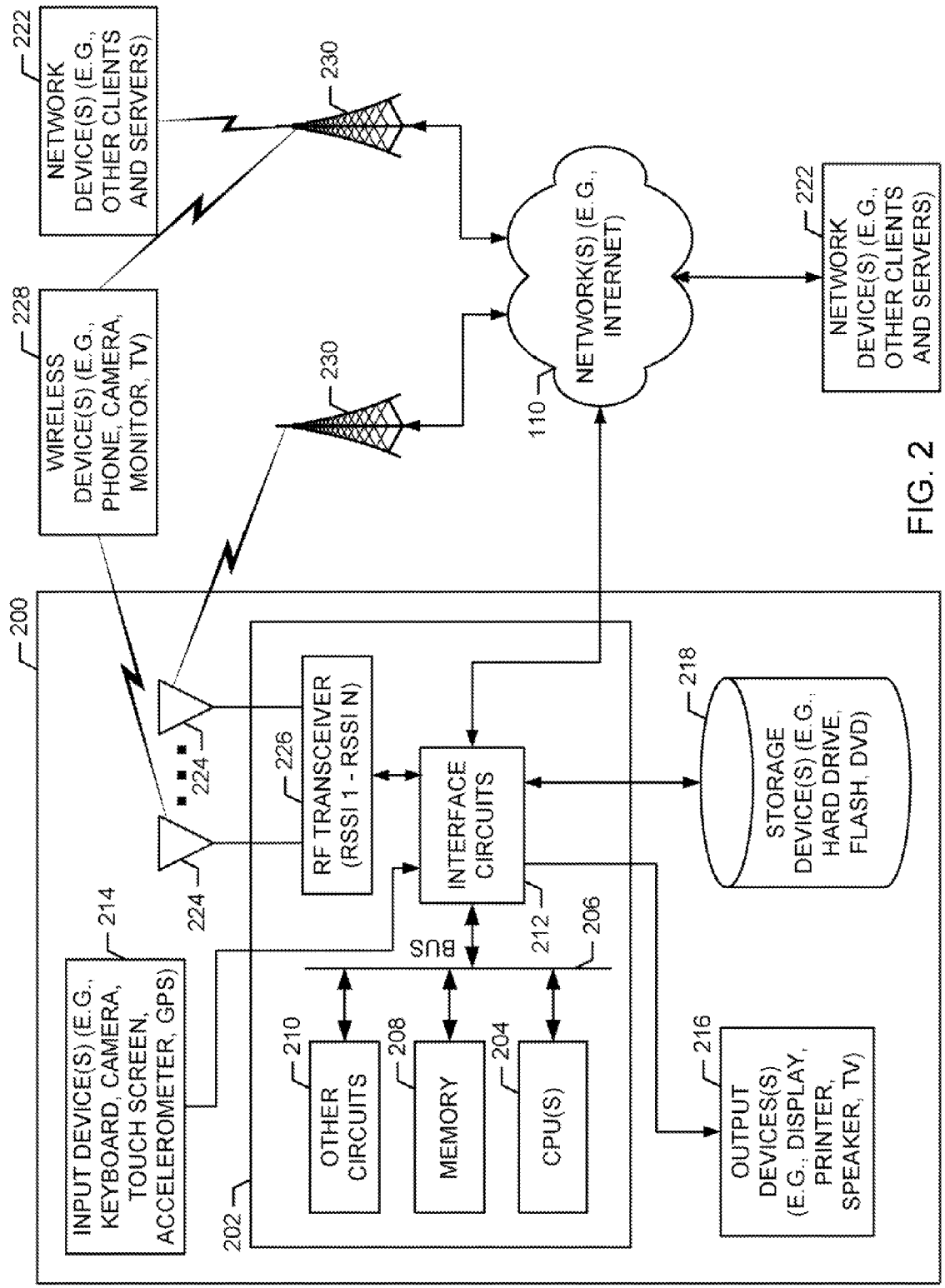
FIG. 2 is a block diagram of an example electronic device for selecting an inter-radio access technology.

Each of the devices illustrated in FIG. 1 (e.g., client 102 and/or server 106) may include certain common aspects of many electronic devices such as microprocessors, memories, peripherals, etc. A block diagram of certain elements of an example electronic device 200 that may be used to select an inter-radio access technology is illustrated in FIG. 2. For example, the electrical device 200 may be a client, a server, a camera, a phone, and/or a television.

The example electrical device 200 includes a main unit 202 which may include, if desired, one or more physical processors 204 electrically coupled by an address/data bus 206 to one or more memories 208, other computer circuitry 210, and one or more interface circuits 212. The processor 204 may be any suitable processor or plurality of processors. For example, the electrical device 200 may include a central processing unit (CPU) and/or a graphics processing unit (GPU). In some embodiments, the physical processor(s) 204 are managed by a hypervisor executing a plurality of virtual processors and/or virtual machines.

The memory 208 may include various types of non-transitory memory including volatile memory and/or non-volatile memory such as, but not limited to, distributed memory, read-only memory (ROM), random access memory (RAM) etc. The memory 208 typically stores a software program that interacts with the other devices in the system as described herein. This program may be executed by the processor 204 in any suitable manner. The memory 208 may also store digital data indicative of documents, files, programs, web pages, etc. retrieved from a server and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, isopoint, camera, voice recognition system, accelerometer, global positioning system (GPS), and/or any other suitable input device.

One or more displays, printers, speakers, monitors, televisions, high definition televisions, and/or other suitable output devices 216 may also be connected to the main unit 202 via the interface circuit 212. The display 216 may be a cathode ray tube (CRTs), liquid crystal displays (LCDs), electronic ink (e-ink), and/or any other suitable type of display. The display 216 generates visual displays of data generated during operation of the device 200. For example, the display 216 may be used to display web pages and/or other content received from a server 106 and other device. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the device 200.

The electrical device 200 may also exchange data with other network devices 222 via a connection to a network 110. The network connection may be any type of network connection, such as an Ethernet connection, digital subscriber line (DSL), telephone line, coaxial cable, wireless base station 230, etc. Users 114 of the system 100 may be required to register with a server 106. In such an instance, each user 114 may choose a user identifier (e.g., e-mail address) and a password which may be required for the activation of services. The user identifier and password may be passed across the network 110 using encryption built into the user's browser. Alternatively, the user identifier and/or password may be assigned by the server 106.

In some embodiments, the device 200 may be a wireless device 200. In such an instance, the device 200 may include one or more antennas 224 connected to one or more radio frequency (RF) transceivers 226. The transceiver 226 may include one or more receivers and one or more transmitters operating on the same and/or different frequencies. For example, the device 200 may include a blue tooth transceiver 216, a Wi-Fi transceiver 216, and diversity cellular transceivers 216. The transceiver 226 allows the device 200 to exchange signals, such as voice, video and data, with other wireless devices 228, such as a phone, camera, monitor, television, and/or high definition television. For example, the device 200 may send and receive wireless telephone signals, text messages, audio signals and/or video signals directly and/or via a base station 230. A receive signal strength indicator (RSSI) associated with each receiver generates an indication of the relative strength or weakness of each signal being received by the device 200.

Figure 3:
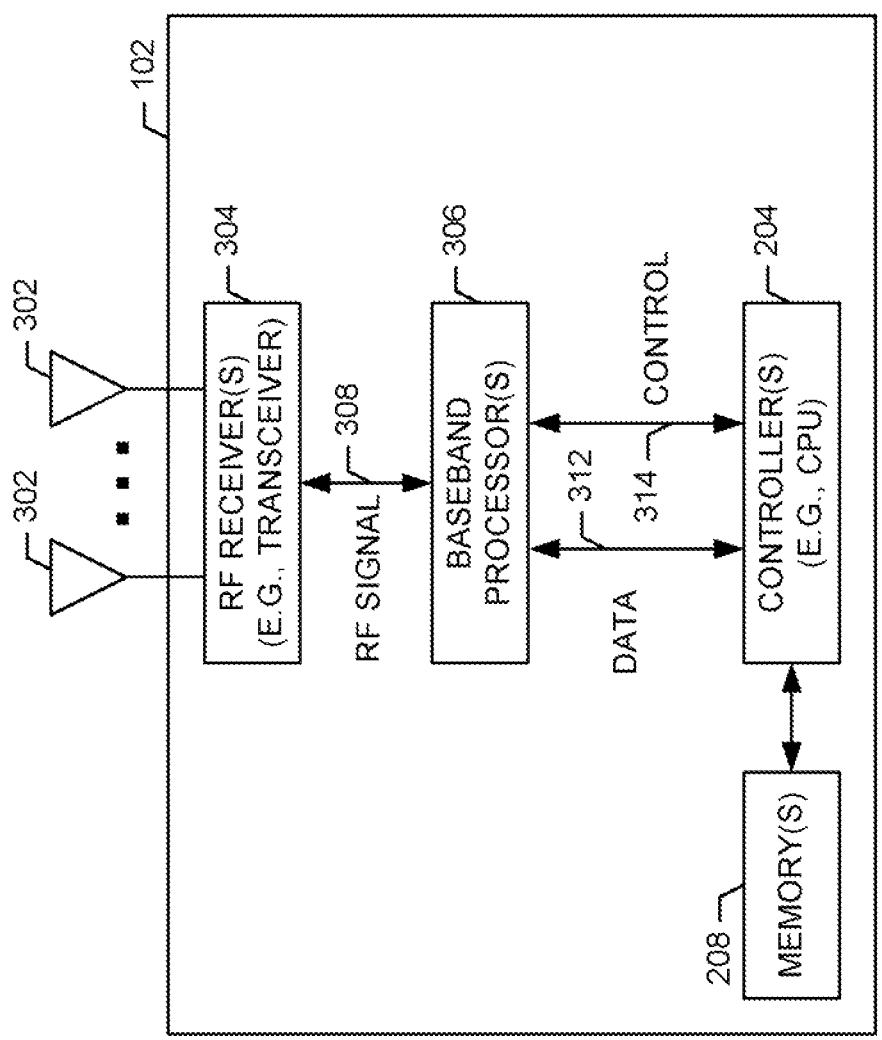
FIG. 3 is a block diagram of another example electronic device for selecting an inter-radio access technology.

A block diagram of certain elements of an example wireless device 102 for selecting an inter-radio access technology is illustrated in FIG. 3. The wireless device 102 may be implemented in hardware or a combination of hardware and hardware executing software. In one embodiment, the wireless device 102 includes a CPU executing software. Other suitable hardware includes one or more application specific integrated circuits (ASICs), state machines, field programmable gate arrays (FPGAs), and/or digital signal processors (DSPs).

In this example, the wireless device 102 includes a plurality of antennas 302 operatively coupled to one or more radio frequency (RF) receivers 304. The receiver 304 is also operatively coupled to one or more baseband processors 306. The receiver 304 tunes to one or more radio frequencies to receive one or more radio signals 308, which are passed to the baseband processor 306 in a well known manner. The baseband processor 306 is operatively coupled to one or more controllers 310. The baseband processor 306 passes data 312 to the controller 310. A memory 316 operatively coupled to the controller 310 may store the data 312.

Figure 4:
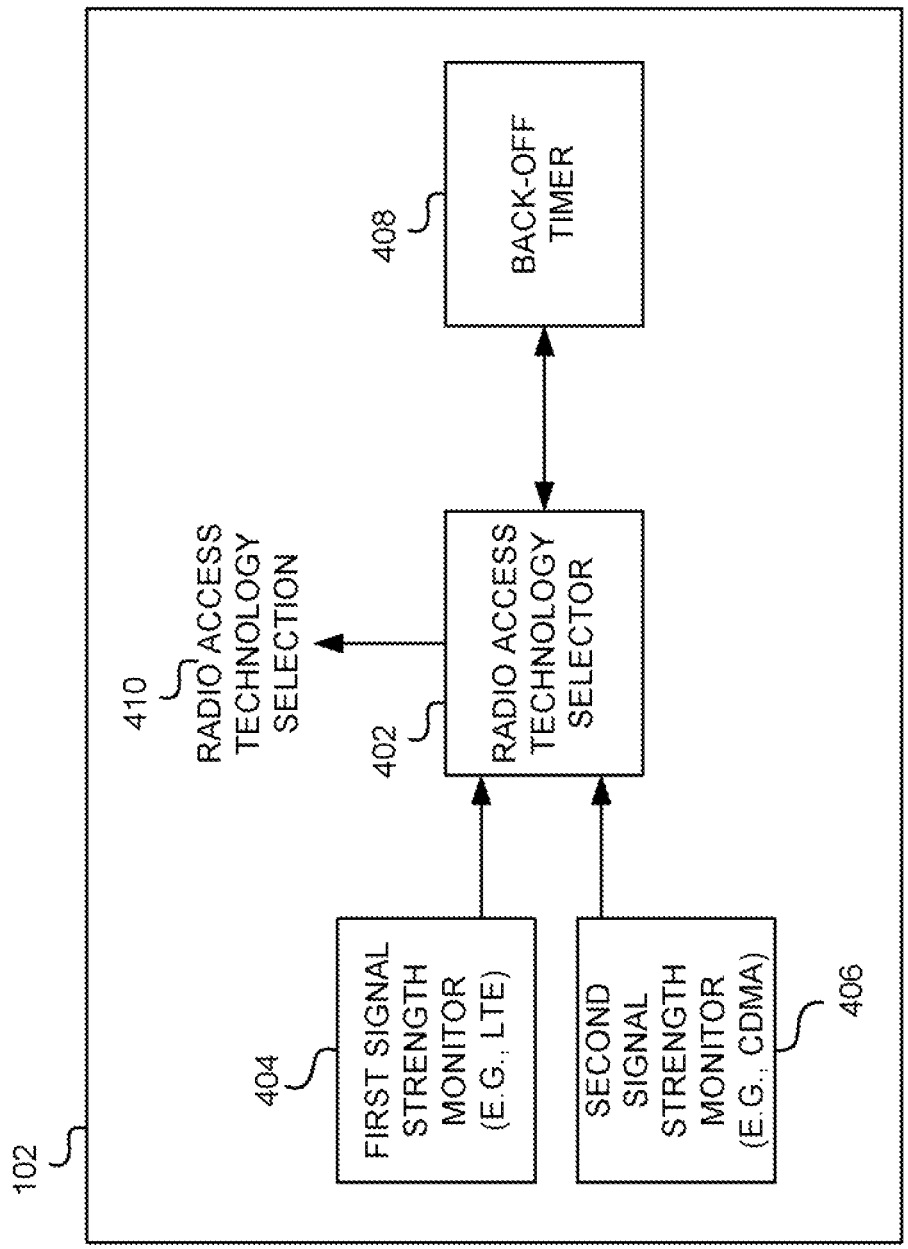
FIG. 4 is a block diagram of yet another example electronic device for selecting an inter-radio access technology.

A block diagram of certain elements of yet another example electronic device 102 for selecting an inter-radio access technology is illustrated in FIG. 4. In this example, a radio access technology selector 402 is operatively coupled to a first signal strength monitor 404 and a second signal strength monitor 406. For example, the first signal strength monitor 404 may be the receive signal strength indicator (RSSI) of a long term evolution (LTE) receiver, and the second signal strength monitor 406 may be the receive signal strength indicator (RSSI) of a code division multiple access (CDMA) receiver.

Although LTE and CDMA are used as examples throughout this detailed description, a person of ordinary skill in the art will readily appreciate that any suitable radio access technology may be used within the scope and spirit of the disclosed system. For example, other suitable radio access technologies include global system for mobile (GSM) access technology and universal mobile telecommunications system (UMTS) access technology.

In this example, the first signal strength monitor 404 determines if a first radio signal strength associated with a first radio access technology is below a first threshold. For example, a wireless communication device may be using LTE, and the LTE signal may become weak enough that the wireless communication device starts looking for an alternate radio access technology. The second signal strength monitor 406 measures a second radio signal strength associated with a second radio access technology in response to the first radio signal strength being below the first threshold. For example, if the LTE signal is weak, the wireless communication device may check to see if the CDMA signal is better.

In an example, the radio access technology selector 402 selects the second radio access technology if the second radio signal strength is above a second threshold and the first signal strength is below a third threshold. For example, if the CDMA signal is strong and the LTE signal is very weak, the radio access technology selector 402 switches from using LTE to using CDMA.

A back-off timer 408 is operatively coupled to the radio access technology selector 402. The back-off timer 408 expires a plurality of times at a decaying rate if the second radio signal strength is not above the second threshold a plurality of times. For example, if the CDMA signal strength is repeatedly not strong enough to cause the radio access technology selector 402 to switch from using LTE to using CDMA, the back-off timer 408 may be set to expire in one second before trying again, and then two seconds before trying again, then three seconds etc. In another example, the back-off timer 408 may employ a plateau decay such as waiting five seconds for five attempts, and then ten seconds for five more attempts, and then 20 seconds for five more attempts, etc.

Figure 5:
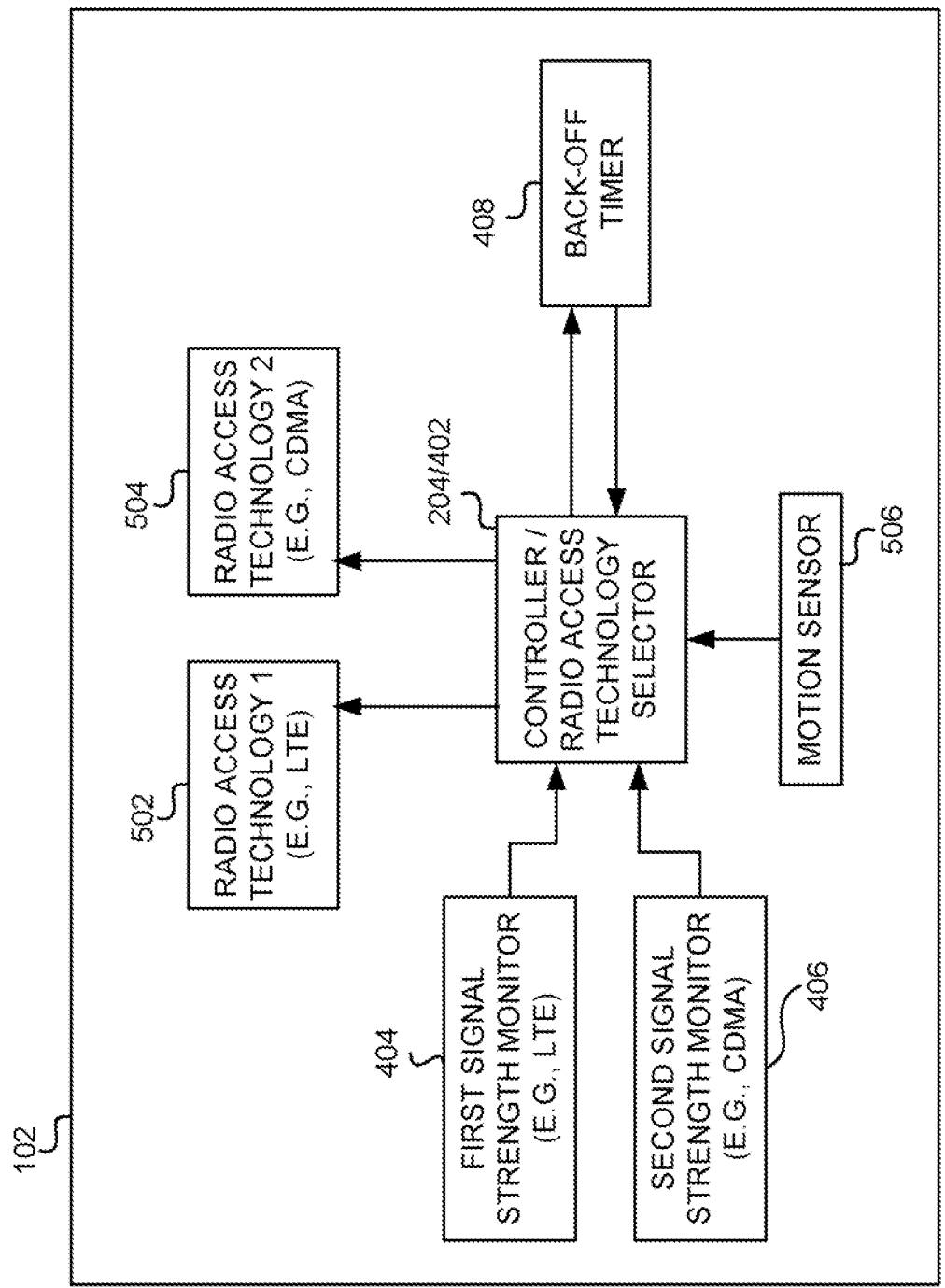
FIG. 5 is a block diagram of still another example electronic device for selecting an inter-radio access technology.

A block diagram of certain elements of yet another example electronic device 102 for selecting an inter-radio access technology is illustrated in FIG. 5. In this example, a controller 204 is operatively coupled to the first signal strength monitor 404 and the second signal strength monitor 406. For example, the first signal strength monitor 404 may be the receive signal strength indicator (RSSI) of a long term evolution (LTE) receiver, and the second signal strength monitor 406 may be the receive signal strength indicator (RSSI) of a code division multiple access (CDMA) receiver.

In this example, the first signal strength monitor 404 determines if a first radio signal strength associated with a first radio access technology 502 is below a first threshold. For example, a wireless communication device may be using LTE, and the LTE signal may become weak enough that the wireless communication device starts looking for an alternate radio access technology. The second signal strength monitor 406 measures a second radio signal strength associated with a second radio access technology 504 in response to the first radio signal strength being below the first threshold. For example, if the LTE signal is weak, the wireless communication device may check to see if the CDMA signal is better.

In an example, the controller 204 includes the radio access technology selector 402. The radio access technology selector 402 selects the second radio access technology 504 if the second radio signal strength is above a second threshold and the first signal strength is below a third threshold. For example, if the CDMA signal is strong and the LTE signal is very weak, the radio access technology selector 402 switches from using LTE to using CDMA.

The back-off timer 408 is operatively coupled to the controller 204 and the radio access technology selector 402. The back-off timer 408 expires a plurality of times at a decaying rate if the second radio signal strength is not above the second threshold a plurality of times. For example, if the CDMA signal strength is repeatedly not strong enough to cause the radio access technology selector 402 to switch from using LTE to using CDMA, the back-off timer 408 may be set to expire in one second before trying again, and then two seconds before trying again, then three seconds etc. In another example, the back-off timer 408 may employ a plateau decay such as waiting five seconds for five attempts, and then ten seconds for five more attempts, and then 20 seconds for five more attempts, etc.

In this example, the controller 204 is operatively coupled to a motion sensor 506. In an example, the motion sensor 506 is an accelerometer and/or a global positioning system (GPS). The motion sensor 506 determines if the electronic device 102 is stationary or in motion. In an embodiment, the back-off timer 408 is used when the electronic device 102 is relatively stationary, and the back-off timer 408 is not used when the device 102 is in motion. When the device 102 is relatively stationary, the signal strength of the second radio access technology (e.g., CDMA) is less likely to improve than when the device 102 is in motion. In an embodiment, the back-off timer 408 is not used or decays at slower rate when the device 102 is motion.

Figure 6:
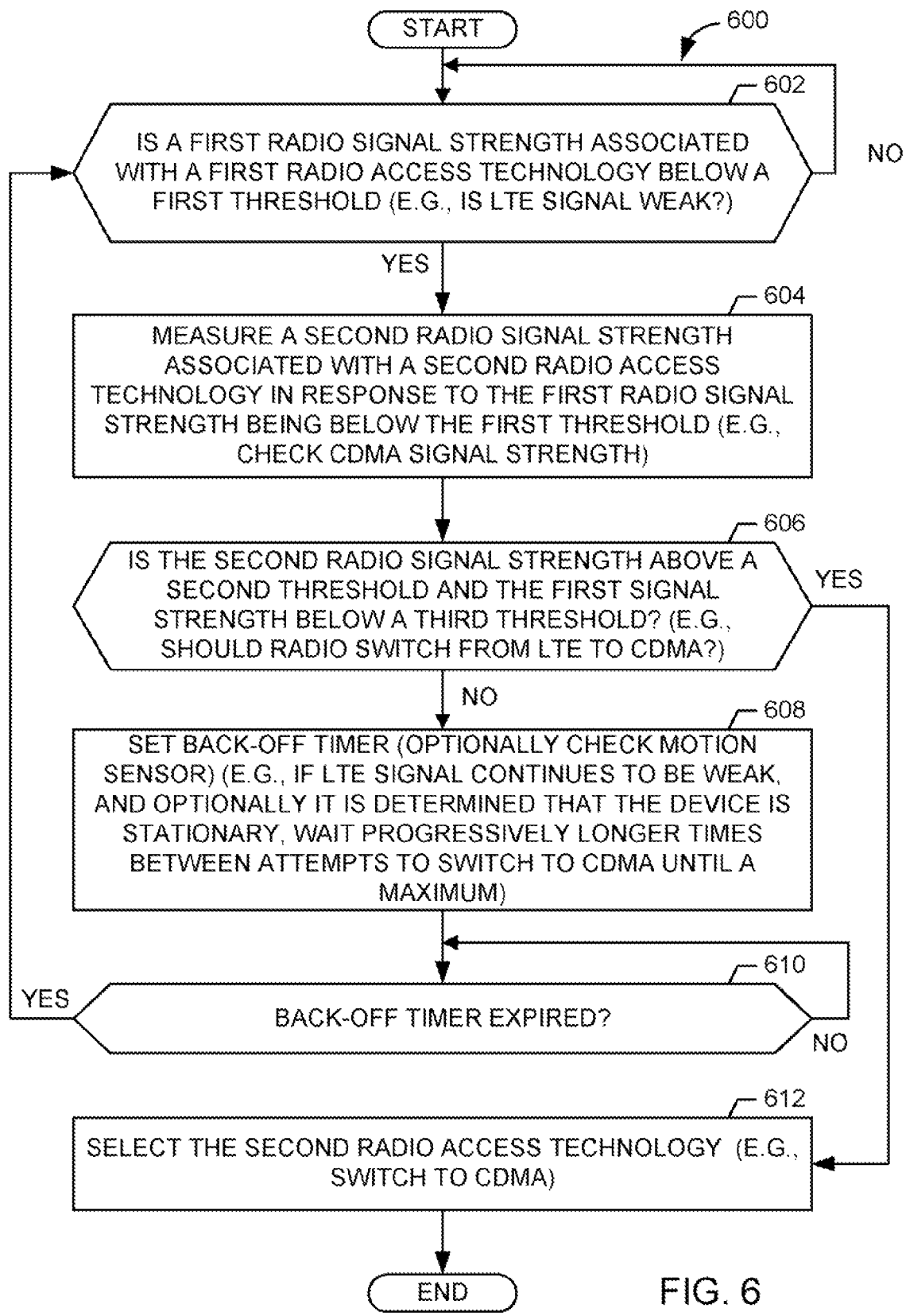
FIG. 6 is a flowchart of an example process for selecting an inter-radio access technology for an electronic device.

A flowchart of an example process 600 for selecting an inter-radio access technology for an electronic device is illustrated in FIG. 6. The process 600 may be carried out by one or more suitably programmed processors such as a CPU executing software (e.g., block 204 of FIG. 2). The process 600 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIG. 6, it will be appreciated that many other methods of performing the acts associated with process 600 may be used. For example, the order of many of the operations may be changed, and some of the operations described may be optional.

In general, a wireless electronic device 102 determines if a first radio signal strength (e.g., LTE) is weak enough that the device 102 should start scanning for another radio access technology (e.g., CDMA). If the first radio signal strength (e.g., LTE) is very weak (e.g., even weaker than the level that caused the device 102 to start scanning), and a second radio signal strength (e.g., CDMA) is above a second threshold, then the device 102 selects the second radio access technology (e.g., switches from LTE to CDMA). If (a) the first radio signal strength (e.g., LTE) is not weak enough to warrant a move to another radio access technology, (b) the second radio signal strength (e.g., CDMA) is not above the second threshold (e.g., not strong enough to warrant a move), and/or (c) a motion sensor 506 determines that the device 102 is relatively stationary (e.g., signal strengths are unlikely to change), then the device 102 sets a back-off timer 408 (e.g., set to expire in one second before trying again, and then two seconds before trying again, then three seconds etc). When the back-off timer 408 expires, the electronic device 102 repeats the process by again determining if the first radio signal strength (e.g., LTE) is weak enough that the device 102 should start scanning for another radio access technology (e.g., CDMA).

More specifically, the example process 600 begins when the wireless electronic device 102 determines that a first radio signal strength associated with a first radio access technology is below a first threshold (block 602). For example, the electronic device 102 may determine that an LTE signal the device 102 is currently using is weak enough that the device 102 may receive a better signal by switching to another radio access technology. Accordingly, the device 102 measures a second radio signal strength associated with a second radio access technology in response to the first radio signal strength being below the first threshold (block 604). For example, the device 102 may check a CDMA signal strength. As an example of how the order of many of the operations in the example process may be changed, the wireless electronic device 102 may determine the first radio signal strength before, after, simultaneously, or substantially simultaneously with determining the second radio signal strength.

If the second radio signal strength is above a second threshold and optionally the first signal strength is below a third threshold (block 606), then the device 102 selects the second radio access technology (block 612). For example, if the CDMA signal is strong and the LTE signal is very weak, the device 102 switches from LTE to CDMA. This selection may be based on an access technology priority optionally received from a cellular network (e.g., prefer LTE to CDMA).

If the second radio signal strength is not above the second threshold and/or the first signal strength is not below a third threshold (block 606), then the device 102 sets the back-off timer 408 (block 608). For example, the back-off timer 408 may be set to expire in one second before trying again, and then two seconds before trying again, then three seconds etc. In another example, the back-off timer 408 may employ a plateau decay such as waiting five seconds for five attempts, and then ten seconds for five more attempts, and then 20 seconds for five more attempts, etc.

When the device 102 is relatively stationary, the signal strength of the second radio access technology (e.g., CDMA) is less likely to improve than when the device 102 is in motion. Accordingly, the device 102 may optionally use a motion sensor 506. For example, the motion sensor 506 may be an accelerometer and/or a global positioning system (GPS). The motion sensor 506 determines if the electronic device 102 is stationary or in motion. In an embodiment, the back-off timer 408 is used when the electronic device 102 is relatively stationary, and the back-off timer 408 is not used when the device 102 is in motion.

When the back-off timer 408 expires (block 610), the electronic device 102 repeats the process 600 by again determining if the first radio signal strength associated with the first radio access technology is below the first threshold (block 602). For example, the electronic device 102 may determine that the LTE signal the device 102 is currently using is still weak enough that the device 102 may receive a better signal by switching to another radio access technology. Accordingly, the device 102 again measures the second radio signal strength associated with the second radio access technology in response to the first radio signal strength being below the first threshold (block 604). For example, the device 102 may check the CDMA signal strength again and then continue the process 600 as described in detail above.

Figure 7:
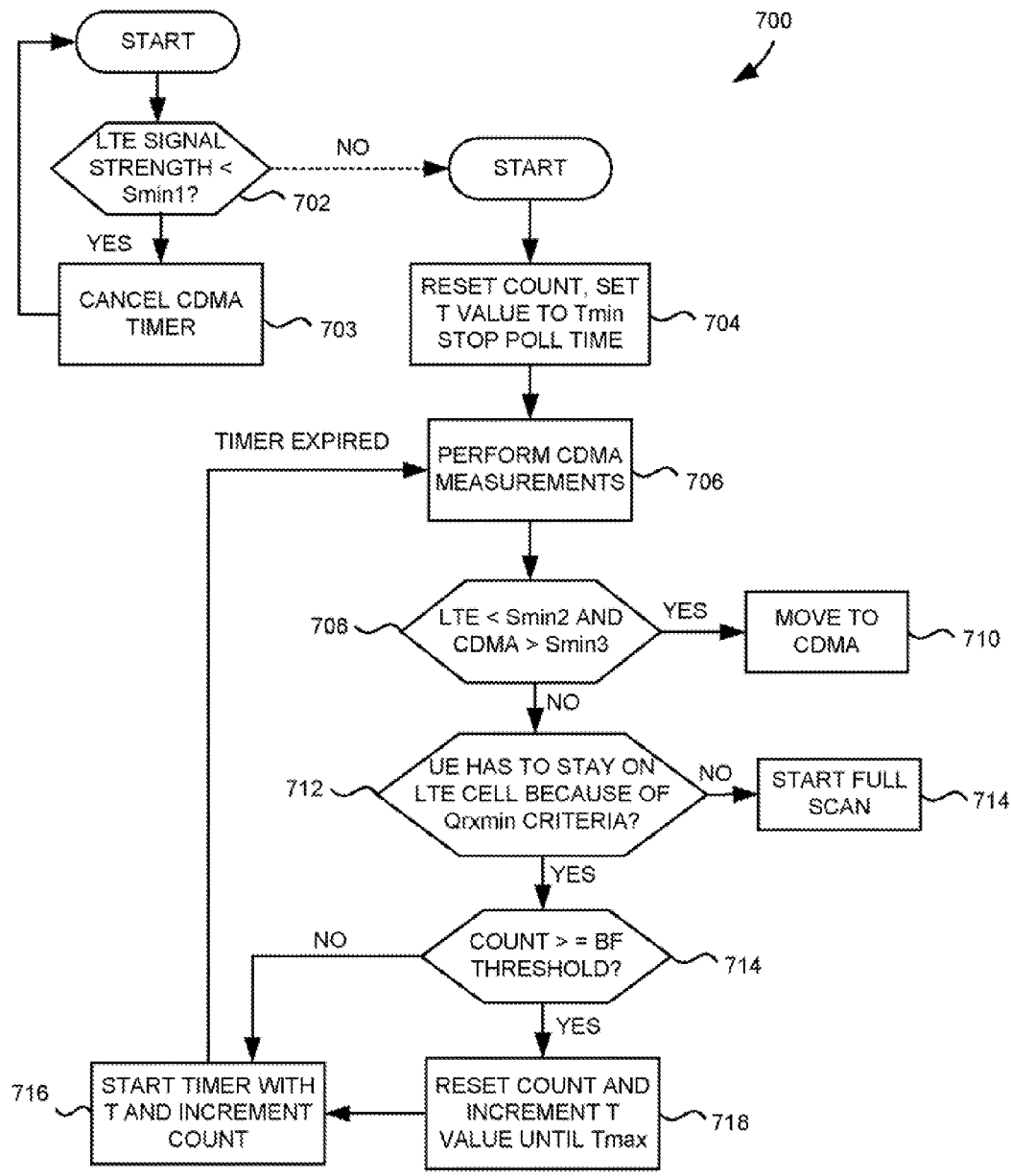
FIG. 7 is a flowchart of another example process for selecting an inter-radio access technology for an electronic device.

A flowchart of another example process 700 for selecting an inter-radio access technology for an electronic device is illustrated in FIG. 7. The process 700 may be carried out by one or more suitably programmed processors such as a CPU executing software (e.g., block 204 of FIG. 2). The process 700 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 700 is described with reference to the flowchart illustrated in FIG. 7, it will be appreciated that many other methods of performing the acts associated with process 700 may be used. For example, the order of many of the operations may be changed, and some of the operations described may be optional.

In general, an electronic device 102 periodically determines if an LTE signal strength is below a first threshold. If the LTE signal strength falls below the first threshold, the electronic device 102 resets a plateau counter and sets a back-off timer 408. The electronic device 102 then determines if a CDMA signal strength is above a threshold and the LTE signal strength is below a second lower threshold. If so, the electronic device 102 switches to the CDMA radio access technology. Otherwise, the electronic device 102 determines if the plateau counter is greater than or equal to a back-off threshold (e.g., 5). If the plateau counter is less than the back-off threshold, the electronic device 102 starts the back-off timer 408 with the current back-off time interval (e.g., one second) and increments the plateau counter. If the plateau counter is not less than the back-off threshold, the electronic device 102 resets the plateau counter (e.g., to zero) and increments the current time interval (e.g., from one second to five seconds) as long as the time interval does not exceed a time interval maximum (e.g., 128 seconds). The electronic device 102 then starts the back-off timer 408 with the current back-off time (e.g., one second) and increments the plateau counter.

More specifically, the example process 700 begins when the electronic device 102 determines if the LTE signal strength is below a minimum (block 702). If the LTE signal strength is not below the minimum, the electronic device 102 cancels any running CDMA timers (block 703) and continues to periodically check if the LTE signal strength is below the minimum. If the LTE signal strength is below the minimum, the electronic device 102 starts a separate process that resets a plateau counter, sets the back-off timer 408 to a minimum value (e.g., one second as received from the cellular network), and stops a CDMA signal strength poll timer (block 704). As an example of how the order of many of the operations in the example process may be changed, the electronic device 102 may reset the plateau counter before, after, simultaneously, or substantially simultaneously with setting the back-off timer 408.

The electronic device 102 then performs one or more measurements to determine the CDMA signal strength (block 706). If certain re-selection criteria are met (block 708) (e.g., the CDMA signal strength is above a threshold and the LTE signal strength is below a threshold), the electronic device 102 switches to the CDMA radio access technology (block 710). If the re-selection criteria are not met (block 708) (e.g., the CDMA signal strength is not above the threshold or the LTE signal strength is above a threshold), the electronic device 102 determines if the electronic device 102 needs to stay on the LTE cell due to the LTE signal strength being above a minimum threshold (block 712). For example, the LTE signal strength may be weak, but not weak enough to cause an immediate change given that the CDMA signal is also weak.

If the LTE signal strength is not above the minimum threshold (block 712) (e.g., out of a service), the electronic device 102 starts a full scan of all available radio access technologies and cells (block 714). If the LTE signal strength is above the minimum threshold (block 712), the electronic device 102 determines if the plateau counter is greater than or equal to a back-off threshold (e.g., 5). If the plateau counter is less than the back-off threshold, the electronic device 102 starts the back-off timer 408 with the current back-off time interval (e.g., one second) and increments the plateau counter (block 716). If the plateau counter is not less than the back-off threshold, the electronic device 102 resets the plateau counter (e.g., to zero) and increments the current time interval (e.g., from one second to five seconds) as long as the time interval does not exceed a time interval maximum (e.g., 128 seconds) (block 718). The electronic device 102 then starts the back-off timer 408 with the current back-off time (e.g., one second) and increments the plateau counter (block 716).

In summary, methods and apparatus for estimating time of arrival information associated with a wireless signal have been described herein. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of selecting an inter-radio access technology for an electronic device, the method comprising:
   determining that a first radio signal strength associated with a first radio access technology is below a first threshold;
   measuring a second radio signal strength associated with a second radio access technology in response to the first radio signal strength being below the first threshold;
   selecting the second radio access technology if the second radio signal strength is above a second threshold;
   setting a back-off timer if the second radio signal strength is not above the second threshold; and
   measuring a third radio signal strength associated with the second radio access technology in response to the back-off timer expiring.

2. The method of claim 1, further comprising:
   determining that the electronic device is stationary; and
   waiting until the electronic device is in motion to measure a fourth radio signal strength associated with the second radio access technology.

3. The method of claim 2, wherein determining that the electronic device is stationary is based on data from an accelerometer.

4. The method of claim 2, wherein determining that the electronic device is stationary is based on data from a global positioning system.

5. The method of claim 1, further comprising:
   determining if the electronic device is stationary or in motion;
   suspending the back-off timer if the electronic device is stationary; and
   setting the back-off timer if the electronic device is in motion.

6. The method of claim 1, further comprising:
   determining if the electronic device is stationary or in motion;
   setting the back-off timer to a first time value if the electronic device is stationary; and
   setting the back-off timer to a second time value if the electronic device is in motion, wherein the first time value is longer than the second time value.

7. The method of claim 1, wherein selecting the second radio access technology includes selecting the second radio access technology if the first radio signal strength is below a third threshold, wherein the third threshold is lower than the first threshold.

8. The method of claim 1, wherein setting the back-off timer includes setting the back-off timer to a first time and subsequently setting the back-off timer to a second time, wherein the second time is longer than the first time.

9. The method of claim 8, wherein the first time is based on a value received from a cellular network.

10. The method of claim 1, wherein the back-off timer reaches a maximum expire time.

11. The method of claim 1, wherein the back-off timer is suspended in response to a radio access technology reselection.

12. The method of claim 1, wherein selecting the second radio access technology is based on an access technology priority.

13. The method of claim 12, wherein the access technology priority is received from a cellular network.

14. The method of claim 1, wherein the first radio access technology includes at least one of a long term evolution (LTE) access technology, a code division multiple access (CDMA2000) access technology, a global system for mobile (GSM) access technology, and a universal mobile telecommunications system (UMTS) access technology.

15. An apparatus for selecting an inter-radio access technology, the apparatus comprising:
- a first signal strength monitor structured to determine if a first radio signal strength associated with a first radio access technology is below a first threshold;
- a second signal strength monitor structured to measure a second radio signal strength associated with a second radio access technology in response to the first radio signal strength being below the first threshold;
- a radio access technology selector operatively coupled to the first signal strength monitor and the second signal strength monitor, the radio access technology selector being structured to select the second radio access technology if the second radio signal strength is above a second threshold; and
- a back-off timer operatively coupled to the radio access technology selector, the back-off timer being structured to expire a plurality of times at a decaying rate if the second radio signal strength is not above the second threshold a plurality of times;
- wherein the second signal strength monitor is structured to measure a third radio signal strength associated with the second radio access technology in response to the back-off timer expiring.

16. The apparatus of claim 15, further comprising a motion sensor, wherein the motion sensor is structured to determine that the electronic device is stationary thereby causing the second signal strength monitor to wait until the electronic device is in motion to measure a fourth radio signal strength associated with the second radio access technology.

17. The apparatus of claim 16, wherein the motion sensor includes an accelerometer.

18. The apparatus of claim 16, wherein the motion sensor includes a global positioning system.

19. The apparatus of claim 15, further comprising a motion sensor, wherein the motion sensor is structured to determine if the electronic device is stationary or in motion and cause the back-off timer to be suspended if the electronic device is stationary and set to a time value if the electronic device is in motion.

20. The apparatus of claim 15, further comprising a motion sensor, wherein the motion sensor is structured to determine if the electronic device is stationary or in motion and cause the back-off timer to be set to a first time value if the electronic device is stationary and a second time value if the electronic device is in motion, wherein the first time value is longer than the second time value.

21. The apparatus of claim 15, wherein the radio access technology selector is structured to select the second radio access technology if the first radio signal strength is below a third threshold, wherein the third threshold is lower than the first threshold.

22. The apparatus of claim 15, further comprising a controller operatively coupled to the back-off timer, wherein the controller is structured to set the back-off timer to a first time and subsequently set the back-off timer to a second time, wherein the second time is longer than the first time.

23. The apparatus of claim 22, wherein the first time is based on a value received from a cellular network.

24. The apparatus of claim 15, wherein the back-off timer is structured to reach a maximum expire time.

25. The apparatus of claim 15, wherein the back-off timer is suspended in response to a radio access technology reselection.

26. The apparatus of claim 15, wherein selecting the second radio access technology is based on an access technology priority.

27. The apparatus of claim 26, wherein the access technology priority is received from a cellular network.

28. The apparatus of claim 15, wherein the first radio access technology includes at least one of a long term evolution (LTE) access technology, a code division multiple access (CDMA2000) access technology, a global system for mobile (GSM) access technology, and a universal mobile telecommunications system (UMTS) access technology.

29. A method of selecting an inter-radio access technology for an electronic device, the method comprising:
- determining that a first radio signal strength associated with a first radio access technology is below a first threshold;
- measuring a second radio signal strength associated with a second radio access technology in response to the first radio signal strength being below the first threshold;
- selecting the second radio access technology if the second radio signal strength is above a second threshold and based on an access technology priority received from a cellular network;
- setting a back-off timer if the second radio signal strength is not above the second threshold, wherein the back-off timer decays from a minimum time value received from the cellular network until an occurrence of one of (a) a radio access technology reselection, and (b) a maximum expire time is reached;
- determining that the electronic device is in motion using at least one of an accelerometer and a global positioning system; and
- measuring a third radio signal strength associated with the second radio access technology in response to the back-off timer being expired and the electronic device being in motion.

* * * * *